(12) United States Patent  
Trainor

(10) Patent No.: US 7,754,539 B2  
(45) Date of Patent: Jul. 13, 2010

(54) MODULE INTEGRATION INTEGRATED CIRCUITS

(75) Inventor: Alan J. A. Trainor, Harlow (GB)

(73) Assignee: SiGe Semiconductor Inc., Ottawa, Ontario (CA)

( * ) Notice: Subject to any disclaimer, the term of this patent is extended or adjusted under 35 U.S.C. 154(b) by 1613 days.

(21) Appl. No.: 10/680,208

(22) Filed: Oct. 8, 2003

(65) Prior Publication Data

US 2005/0079844 A1   Apr. 14, 2005

(51) Int. Cl.  
*H01L 21/82* (2006.01)

(52) U.S. Cl. .................................. 438/128; 455/252.1

(58) Field of Classification Search ................. 438/128; 455/252.1, 333, 550, 558  
See application file for complete search history.

(56) References Cited

U.S. PATENT DOCUMENTS

| | | | | |
|---|---|---|---|---|
| 5,258,325 | A | | 11/1993 | Spitzer et al. |
| 5,731,945 | A | | 3/1998 | Bertin et al. |
| 5,844,853 | A | * | 12/1998 | Kitsukawa et al. ........... 365/226 |
| 6,075,995 | A | | 6/2000 | Jensen |
| 6,734,553 | B2 | * | 5/2004 | Kimura ....................... 257/723 |
| 7,476,813 | B2 | * | 1/2009 | Shi et al. .................... 174/262 |
| 2001/0011926 | A1 | | 8/2001 | Adar |
| 2003/0165052 | A1 | | 9/2003 | Negishi et al. |

FOREIGN PATENT DOCUMENTS

| | | |
|---|---|---|
| EP | 0 436 074 A1 | 7/1991 |
| EP | 0 543 430 A2 | 5/2003 |
| EP | 1 385 305 A1 | 1/2004 |
| JP | 2001298123 | 10/2001 |
| WO | WO 96/13965 | 5/1996 |
| WO | WO 03/061174 A2 | 7/2003 |

OTHER PUBLICATIONS

Guckenberger et al., "Integrated DC-DC Converter Design for Improved WCDMA Power Amplifier Efficiency in SiGe BiCMOS Technology", Proceedings of the 2003 International Symposium on Low Power Electronics and Design ISLPED '03, Aug. 25-27, 2003, pp. 449-454.  
Diels et al., "Single Package Integration of RF Blocks for a 5 Ghz WLAN Application", IEEE Transactions on Advanced Packaging, vol. 24, No. 3, Aug. 2001, pp. 384-391.  
Furst R: "With GaAs Mmics Towards Dual Band Front End Applications In Wireless Communication" European Microwave Conference. Conference Proceedings, vol. 2, Sep. 8, 1997, pp. 1289-1294, XP010253196.  
USPTO, for U.S. Appl. No. 10/857,938, 1st Office Action mailed Jan. 25, 2008.  
U.S. Appl. No. 10/857,938, response to 1st Office Action filed Apr. 3, 2008.

* cited by examiner

*Primary Examiner*—Charles D Garber  
*Assistant Examiner*—Stanetta D Isaac  
(74) *Attorney, Agent, or Firm*—Townsend and Townsend and Crew LLP

(57) ABSTRACT

An electronic module that operates at various radio frequency standards is provided. The module includes a first integrated circuit die formed in a first semiconductor substrate and manufactured using a first semiconductor process. Disposed within the first integrated circuit is the first signal conditioning circuit for performing a function and the first and second ancillary circuits. The first ancillary circuit electrically coupled to the first signal conditioning circuit for use by the first signal conditioning circuit during operation thereof. The second ancillary circuit is for other than being used by the first signal conditioning circuit during operation thereof since the second integrated circuit die is electrically coupled to the second ancillary circuit and formed in the second semiconductor substrate and co-located with the first integrated circuit within the module. The second integrated circuit die benefits from the operation of the second ancillary circuit for functioning thereof for performing a similar function to the first signal conditioning circuit.

30 Claims, 4 Drawing Sheets

MODULE INTEGRATION INTEGRATED CIRCUITS

FIELD OF THE INVENTION

The invention relates to the field of RF front-end circuits and more specifically to the field of multi-standard RF front-end circuits implemented in a small module size.

BACKGROUND OF THE INVENTION

Typically, manufacturers in the area of wireless products wish to implement radio media interface circuits into radio terminals, such as PCMCIA cards or dongles, which typically must operate within the context of two or more radio standards but in accordance with one standard at any one time. These radio standards are for example collectively referred to as the IEEE 802 standard, which is well known to those of skill in the art. This standard is typically divisible into a number of individual radio standards including one standard at 5.8 GHz, known as 802.11a, and another two standards at 2.45 GHz, known as 802.11b and 802.11g.

In terms of these radio standards, manufacturers are often interested in building radio terminals that will be able to operate at 802.11a, b, and g standards, with only one particular standard being active at any one time. As a result, the manufacturers are interested in acquiring a front-end module that incorporates receive and transmission elements such as the low noise amplifiers (LNA), power amplifiers (PA), impedance matching components, and RF switches for all the standards that the terminal or card must deal with. Thus providing them with flexibility in their radio terminal designs.

Unfortunately, PAs and other components such as the LNA, are highly specialized components that have specifications that generally do not overlap with other radio frequency bands. Thus, a 5.8 GHz PA is generally not suitable for use as a 2.4 GHz PA. As a result, distinct components such as the LNAs and PAs are incorporated into the module in order to accommodate different radio standards. Moreover, many of the high performance RF components such as PAs and LNAs have a relatively low level of ancillary circuit integration. For example, voltage regulation circuits, temperature regulation circuits, control circuits and other circuits that are used for control and optimization of the operation of the PA are often not integrated into a same die with the PA but rather disposed as discrete components, on separate semiconductor substrates, within the module surrounding the PA die. It is well understood by most module designers that adding more components to the module increases cost, reduces yield and durability while resulting in an increase in module size. This effect is compounded when additional circuitry is used for each active RF component such as an RF switch, LNA, and PA.

Recent advances in SiGe BiCMOS technology have allowed for progressively higher levels of integration of high-performance RF components. For example, a high-performance 2.45 GHz PA for the 802.11b/g standard implemented in SiGe BICMOS technology can incorporate voltage and temperature regulation circuitry along with various power optimization and control schemes manifested in control circuitry. The benefit of such high levels of integration are well understood by the IC design community and include reduced module sizes, reduced cost, reduced assembly time, and increased yield and module longevity. Moreover, for PAs in particular, the robustness of the PA in tolerating of mismatch conditions to the antenna can be improved with voltage standing wave ratio (VSWR) sensing circuitry and PA output power sensing circuitry integrated into the PA chip. In this particular example, a determination of high VSWR might lead to the generation of a control signal to reduce power output and thereby protect one or more PA gain stages from over voltage conditions. Clearly, integration of this type of ancillary circuitry into the PA has the potential to increase PA performance and robustness with a minimum increase in the module size. In respect of LNAs, the integration of bias point control circuitry is important.

However, the usage of SiGe BiCMOS technology in the industry is currently limited. For example, for 5.8 GHz PAs, only a small number of manufacturers are utilizing SiGe whereas several end users are utilizing GaAs or group III-V based technologies. The GaAs based technologies however offer more gain per stage and lower losses in the RF signal path at 5.8 GHz. GaAs based technology, however, is often unsuitable for the integration of ancillary circuits for use with the GaAs based RF component. Voltage regulation, for example, may not be integrated into the GaAs based PA due to the lack of suitable elementary devices within the GaAs based technology. Therefore, in the context of a module, the module designer is compelled to add those additional circuits, or dies, for supporting of the GaAs based components. As mentioned previously, the addition of more components causes a detriment to the module size and cost.

A need therefore exists to for providing a compact RF module that supports a number of RF standards. It is therefore an object of the invention to provide a compact RF module that overcomes the limitations of the prior art by facilitating integration of multiple circuit components into a same module in order to support a number of RF standards.

SUMMARY OF THE INVENTION

In accordance with the invention there is provided an electronic apparatus comprising: a first integrated circuit semiconductor die comprising: a first signal conditioning circuit integrated within the first integrated circuit die for performing a first signal conditioning function on a signal propagating along a first signal path; a first ancillary circuit integrated within the first integrated circuit die and electrically coupled to the first signal conditioning circuit for other than performing the first signal conditioning function and for use by the first signal conditioning circuit during operation thereof; a second integrated circuit semiconductor die comprising: a second signal conditioning circuit integrated within the second integrated circuit die for performing a second signal conditioning function on a signal propagating along a second signal path that is different than the first signal path; a second ancillary circuit integrated within the first integrated circuit semiconductor die and electrically coupled to the second signal conditioning circuit for other than performing the second signal conditioning function and for use by the second signal conditioning circuit during operation thereof; a substrate for supporting the first and second integrated circuit semiconductor dies and for providing electrical connection to and from the first and second integrated circuit semiconductor dies.

In accordance with the invention there is provided an electronic apparatus comprising: a first integrated circuit die formed using a first semiconductor process, the first integrated circuit die other than requiring additional circuitry for use in performing a first signal conditioning function comprising: a first signal conditioning circuit for performing the first signal conditioning function and having a first input port for receiving a first input signal for performing the first signal conditioning function thereon and having a first output port for providing a first output signal therefrom; a first ancillary circuit electrically coupled to the first signal conditioning circuit for use by the first signal conditioning circuit during operation thereof; a second ancillary circuit having a first interface port; and, a second integrated circuit die formed using a second semiconductor process and having a second input port for receiving a second input signal, and a second output port for providing a second output signal therefrom, the second integrated circuit die having a second interface port for interfacing with the first interface port for performing a second signal conditioning function in conjunction with the second ancillary circuit disposed on the first integrated circuit die with no signal communication occurring between the first and second input ports and between the first and second output ports.

In accordance with the invention there is provided a method of manufacturing a circuit for reducing crosstalk comprising the steps of: providing a first signal conditioning circuit; providing a second signal conditioning circuit; implementing the first signal conditioning circuit within a first semiconductor die; implementing a first portion of the second signal conditioning circuit in the first semiconductor die; implementing a second portion of the second signal conditioning circuit in a second semiconductor die; bonding the first and second dies to a common substrate; and, wire bonding between the two dies to complete the second signal conditioning circuit.

BRIEF DESCRIPTION OF THE DRAWINGS

Exemplary embodiments of the invention will now be described in conjunction with the following drawings, in which.

DETAILED DESCRIPTION OF THE INVENTION

Figure 1:
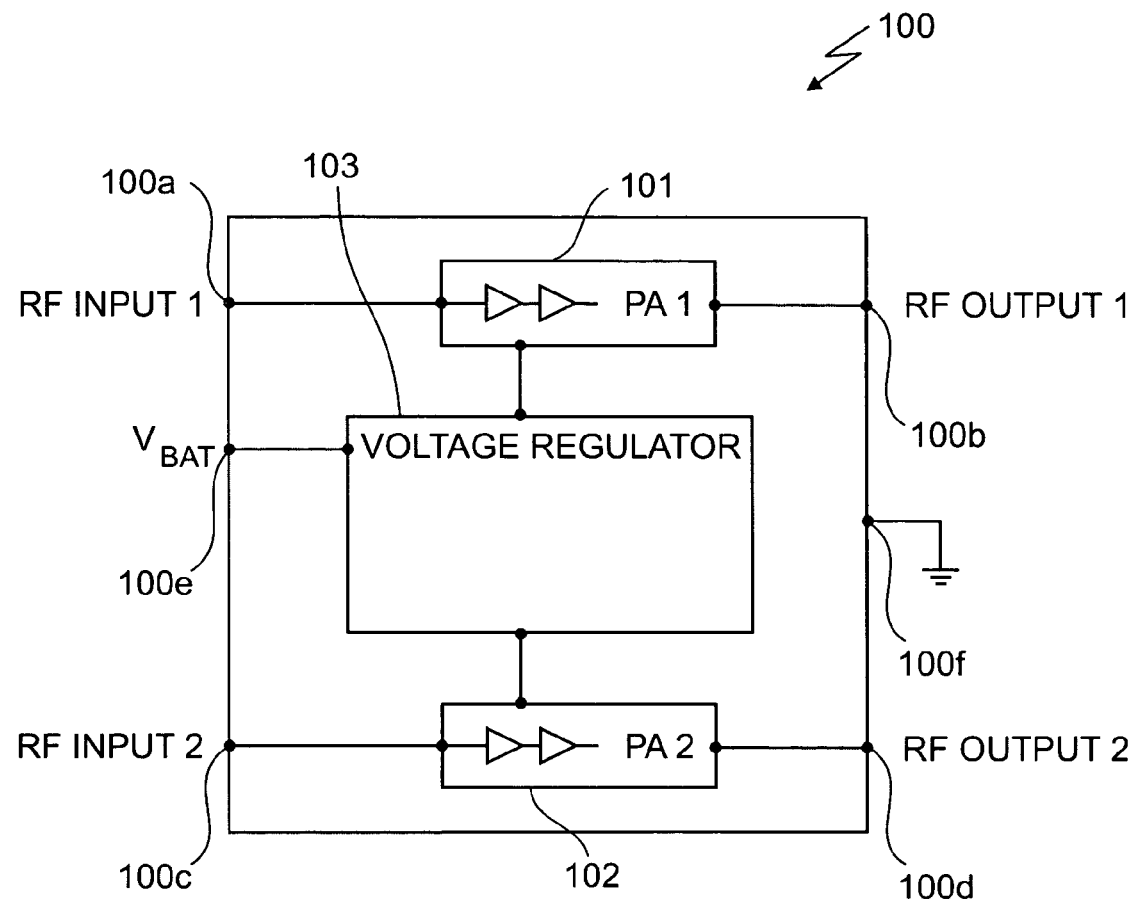
FIG. 1 illustrates a prior art integration of components into a module.

FIG. 1 illustrates a prior art integration of components into a module 100. Disposed within the module 100 is a first signal conditioning circuit 101, a second signal conditioning circuit 102 and a voltage regulator circuit 103. The first signal conditioning circuit is disposed between a first RF signal input port 100a and a first RF signal output port 100b. The second signal conditioning circuit is disposed between a second RF signal input port 100c and a second RF signal output port 100d. A regulated supply voltage is provided to both the first and second signal conditioning circuits from the regulator circuit 103, which is disposed on a different semiconductor substrate than the first and second signal conditioning circuits, 101 and 102. A supply voltage is provided to the regulator circuit 103 from a battery (not shown) through a positive supply voltage input port 100e and through a ground port 100f. The first and second signal conditioning circuits are also connected to the ground port 100f.

The voltage regulator circuit 103 is disposed as the third component of this module 100. Typically, the voltage regulation properties of the regulator circuit 103 are not optimized for operating with either the first or the second signal conditioning circuits in order to save on module cost 100. But, a trade-off in the module 100 specifications allows for the use of a single regulator circuit 103 for regulating the supply voltage to both signal conditioning circuits. Providing a separate voltage regulator for each signal conditioning circuit would unfortunately add another semiconductor substrate to the module 100 and result in an increased module cost.

For example, the module 100 shown in FIG. 1 is for use in cellular telephones, where two cellular band power amplifier circuits (PAs) are incorporated into the module as the first and second signal conditioning circuits, 101 and 102. In such a module, the voltage regulation circuit is typically silicon-based and disposed with power amplifier modules of two different types, such as GaAs based PAs. It is not uncommon to find that the module size is determined by the area required for the ancillary circuits, such as the voltage regulation circuit 103, rather than by the area required by core RF components, such as the PAs.

Referring to the prior art module illustrated in FIG. 1, all circuits included into the module are disposed as discrete components. Unfortunately, this leads to progressively larger and more expensive modules as functionality and performance are increased. A further disadvantage of the old technology lies in the additional assembly cost and additional assembly time associated with placing and wiring these numerous circuits and components within the module 100. It is well understood that in designing and manufacturing of the module, the area requirements grow in proportionality to the number of circuits and components used. Furthermore, the probability of manufacturing errors and defects increases in proportion to the number of circuits and components required in the design.

Figure 2:
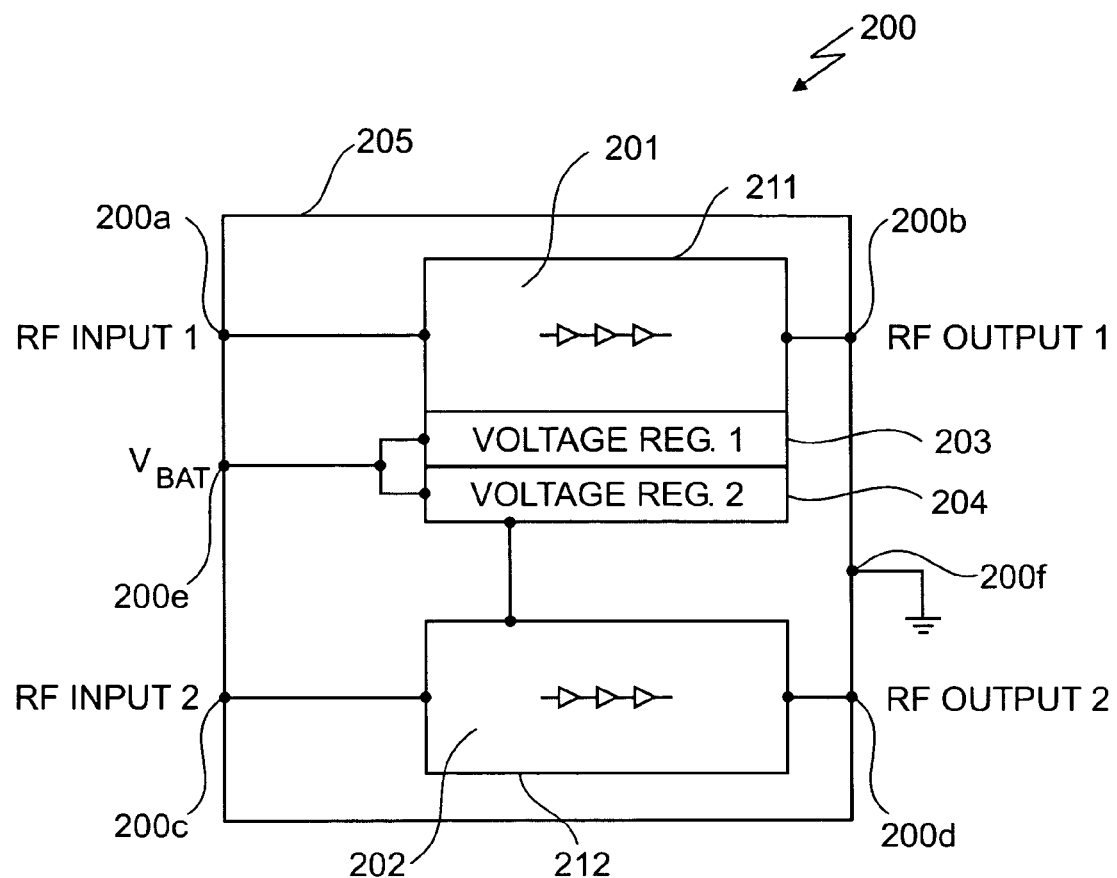
FIG. 2 illustrates a first embodiment of the invention, a module 200 having two semiconductor substrates integrated within the module, as opposed to three, as shown in FIG. 1; and, FIG. 3 illustrates a second embodiment of the invention, which illustrates a more specific implementation of the first embodiment of the invention.

FIG. 2 illustrates a first embodiment of the invention, a module 200 having two semiconductor substrates integrated within the module, as opposed to three, as shown in FIG. 1. A first signal conditioning circuit 201 is formed on a first semiconductor substrate 211 and a second signal conditioning circuit 202 is formed on a second semiconductor substrate 212. The first signal conditioning circuit 201 is disposed between a first RF signal input port 200a and a first RF signal output port 200b. The second signal conditioning circuit 202 is disposed between a second RF signal input port 200c and a second RF signal output port 200d.

In addition, a first ancillary circuit 203 and a second ancillary circuit 204 are disposed on the first semiconductor substrate 211. The first ancillary circuit 203, in the form of a first voltage regulator circuit, is for providing a first regulated supply voltage to the first signal conditioning circuit 201. The second ancillary circuit 203, in the form of a second voltage regulator circuit, is for providing a second regulated supply voltage to the second signal conditioning circuit 202. An unregulated supply voltage from a source (not shown) is provided to the first and second regulator circuits through a positive supply voltage terminal 200e and a ground terminal 200f. In this embodiment, the first and second voltage regulator circuits, 203 and 204, are integrated into the first semiconductor substrate 211, along with the first signal conditioning circuit 201. A first interface port 211a disposed on the first semiconductor die 211 and connected to the second ancillary circuit 204 connects the second ancillary circuit 204 to the second semiconductor die using a second interface port 212a. The second interface port 212a is connected to the second signal conditioning circuit 202. For example, the first signal conditioning circuit comprises an amplifying circuit, such as a PA circuit or a low noise amplifier (LNA) circuit.

The integration of circuit components into the module 200 provides for a first integrated circuit formed in a first semiconductor substrate 211 and manufactured using a first semiconductor process. Disposed within the first integrated circuit is the first signal conditioning circuit 201 for performing a first signal conditioning function and the first ancillary circuit 203 electrically coupled to the first signal conditioning circuit 201 only for use by the first signal conditioning circuit 201 during operation thereof. The second ancillary circuit 204 is for other than being used by the first signal conditioning circuit 201 during operation thereof. The second integrated circuit 202 is electrically coupled to the second ancillary circuit 204 and formed in the second semiconductor substrate 212 and co-packaged with the first integrated circuit 211 within the module 200. The second integrated circuit 202 operates in conjunction with the second ancillary circuit 204, via the connection between the first and second interface ports, 211a and 212a, for performing the second signal conditioning function. Optionally, the second signal conditioning function is a similar function to the function performed by the first signal conditioning circuit 201.

Advantageously, the integration of circuit functionality into one or more of the semiconductor substrates offers immediate benefit. Integration of these ancillary circuits into the same die area already occupied by one of the other core components is efficient in respect of die area usage. The integration into a module 200, as shown in FIG. 2, allows for integration of different signal conditioning circuits that do not have overlap in their RF bands. The first signal conditioning circuit 201 is for example integrated within the first semiconductor substrate 211 using SiGe BiCMOS technology, along with the first and second voltage regulator circuits, 203 and 204. The second signal conditioning circuit 202 is, for example, integrated into the semiconductor substrate 212 using a GaAs process. As a result of this integration, the completed module 200 accommodates different radio standards in a single package. For example, for a 5.8 GHz PA, the second signal conditioning circuit 202 is used and for a 2.45 GHz PA the first signal conditioning circuit is used 201.

Figure 3:
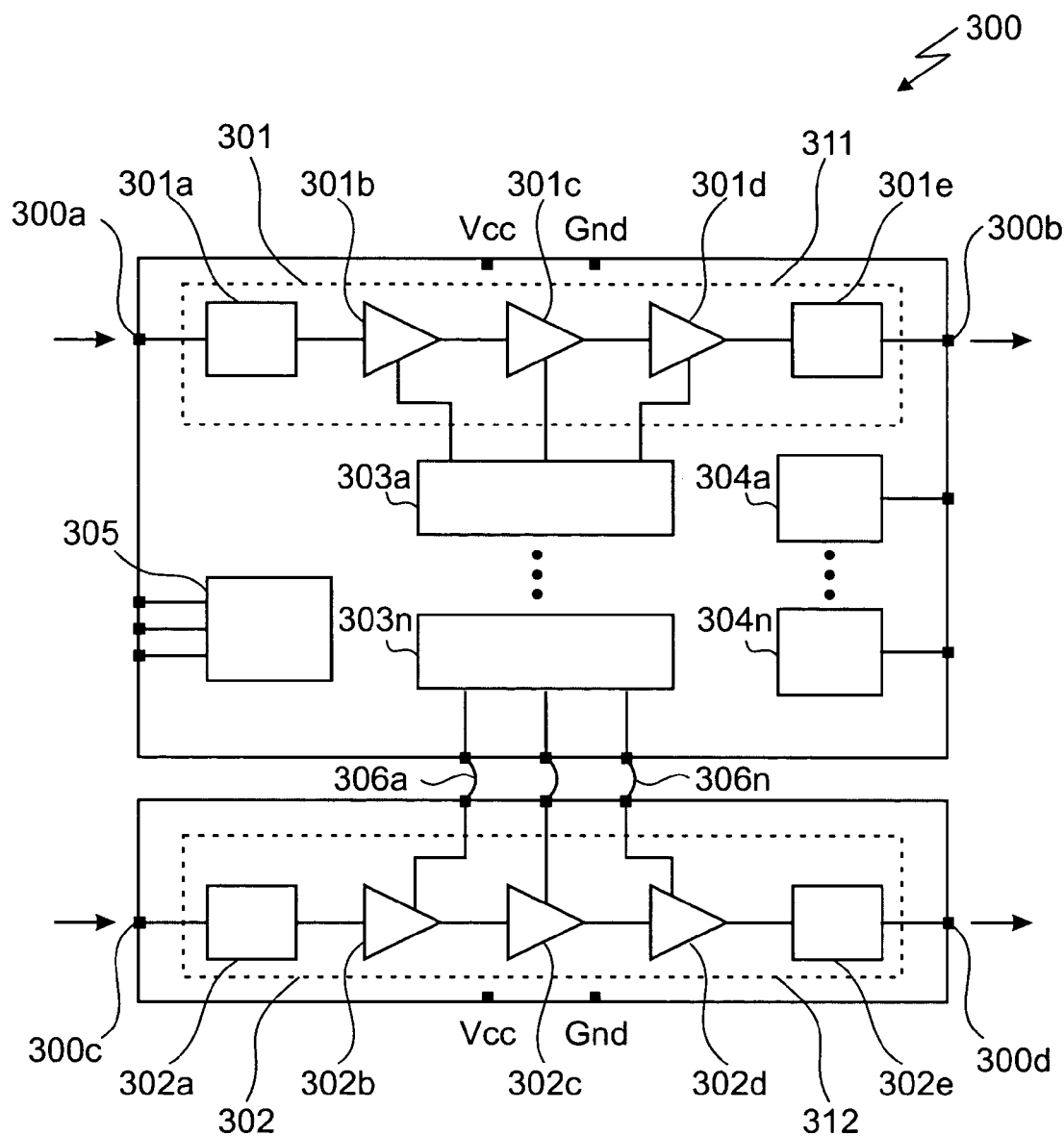

FIG. 3 illustrates a second embodiment of the invention, which illustrates a more specific implementation of the first embodiment of the invention. Referring to FIG. 3, a module 300 having two semiconductor substrates, 311 and 312, integrated therein, is shown. A first signal conditioning circuit 301 is formed on a first semiconductor substrate 311 and a second signal conditioning circuit 302 is formed on a second semiconductor substrate 312. The first signal conditioning circuit 301 is disposed between a first RF signal input port 300a and a first RF signal output port 300b along a first signal path. The second signal conditioning circuit 302 is disposed between a second RF signal input port 300c and a second RF signal output port 300d along a second signal path.

A first plurality of ancillary circuitry 303a through 303n, in the form of a first plurality of control circuitry, is disposed within the first semiconductor substrate 311. At least one of the plurality 303n of ancillary circuitry, 303a through 303n, is unrelated to the operation of the first signal conditioning circuit 301 and used for accommodating the requirements of the second signal conditioning circuit 302 formed on the second semiconductor substrate 312. A plurality of electrical connections, 306a through 306n,—in the form of wire bonds, for example, is used for electrically coupling the at least one of the plurality 303n of ancillary circuitry to the second semiconductor substrate 312 for use by the second signal conditioning circuit 302. The plurality of electrical connections are disposed between a first plurality of interface ports disposed on the first semiconductor die and connected to the a least one of the plurality 303n of ancillary circuitry, 303a through 303n, and a second plurality of interface ports. The second plurality of interface ports are connected to the second signal conditioning circuit 302. The second signal conditioning circuit 302 is for performing a second signal conditioning function in conjunction with the at least one of the plurality 303n of ancillary circuitry, 303a through 303n, connected thereto. The first signal conditioning circuit 301 is for performing a first signal conditioning function independent of the second signal conditioning circuit 302. As a result, RF signals propagating along the first signal path and the second signal path do not interfere with each other because the signal paths are separated on separate semiconductor dies.

Referring to the embodiment shown in FIG. 3, the first signal conditioning circuit comprises a first impedance transforming circuit 301a, in series with three amplification stages, 301b through 301d, and in series with a second impedance transforming circuit 301e. Disposed within the second signal conditioning circuit are a third impedance transforming circuit 302a, in series with three amplification stages, 302b through 302d, and in series with a second impedance transforming circuit 302e. Although the signal conditioning circuits are disposed on different semiconductor substrates, they perform similar functions. In this case, both signal conditioning circuits comprise PAs since they are used in RF amplification applications and as a result provide similar functions.

In addition, a plurality of power detector circuits 304a through 304n are also preferably integrated within the first semiconductor substrate 311. These power detector circuits are preferably used for detecting of RF output signal power being propagated from the first RF signal output port 300b and the second RF signal output port 300d. Other circuit blocks, such as circuit block 305, are also integrated within the first semiconductor substrate. Because the first semiconductor substrate is preferably manufactured using a process that supports a plurality of suitable elementary devices, such as SiGe BiCMOS, the integration of the first and second ancillary circuits is facilitated and serves to reduce space in the module without the addition of additional circuit components manufactured on additional semiconductor substrates, which causes a detriment to the module size and cost. Preferably, the semiconductor process that supports a larger scale of integration is utilized for integrating of a larger plurality of integrated circuit components therein.

Integration of a majority of ancillary circuit functionality into one or more of the semiconductor dies offers immediate benefit. Integration of these ancillary circuits into the same die area used by one of the core components is very efficient in respect of area usage within the module. The integration into a module, as shown in FIG. 2 and FIG. 3, allows for integration of different signal conditioning circuits into a same module that do not have overlap in their RF bands.

Optionally, a carrier platform, element 205 shown in FIG. 2, is used for supporting the various semiconductor dies, 211 and 212, and optionally other electrical components. The carrier platform 205 is for example a multi-layer laminate or even a silicon-based platform. The function of the carrier platform 205 is to support the semiconductor dies and to provide a means of interconnecting the electrical signals and power supply rails for each semiconductor die, 211 and 212. The embodiments of the invention are applicable for use in modules and other types of sub-assemblies where more than one component is co-located. Co-location referring to the disposition of the module components in close enough proximity such that PCB traces, wirebonds or other technologies are used to interconnect the components to each other. Often the components are in close enough proximity that wirebonding from one semiconductor die to another is sufficient. Thus, these semiconductor dies, 211 and 212, are placed onto the carrier platform 205 and wirebonded or flip-chipped to establish an electrical connection to interconnect traces forming part of the carrier platform 205. Typically, after placement of semiconductor dies and upon completion of wiring therebetween a mold compound is applied to finish the module.

Advantageously, only one of the semiconductor substrates within the module are designed to incorporate all the additional regulation and optimization circuitry required by the other signal conditioning circuits in the form of active RF components. In this manner, die area within the module is minimized, and thereby cost, and the number of components that require circuit connections therebetween is minimized. Furthermore, selection of active RF components on the basis of RF performance is greatly facilitated without placing additional regulation and additional optimization circuits for the greater performing RF components.

Disposing the first and second signal conditioning circuits on separate substrates advantageously eliminates crosstalk issues therebetween. Thus, output signal noise is minimized. Prior to designing of a module, a module designer of skill in the art determines which signal conditioning circuits will pose problems when integrated on a same semiconductor die and as such those circuits are integrated on separate dies.

Figure 4:
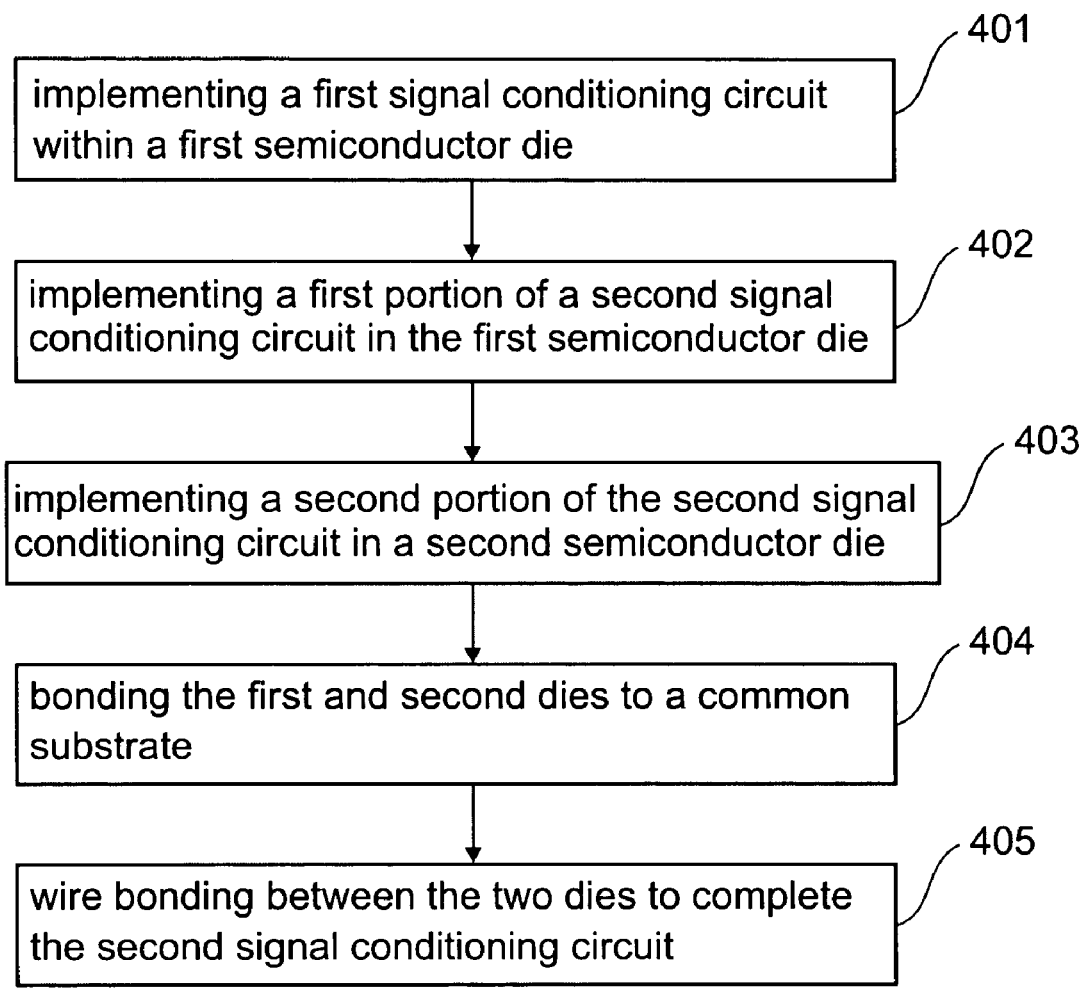
FIG. 4 illustrates the method of manufacturing a circuit in accordance in accordance with an embodiment of the present invention.

FIG. 4 illustrates a method steps for manufacturing a circuit for reducing crosstalk therein. A first signal conditioning circuit is implemented within a first semiconductor die, in step 401. A first portion of a second signal conditioning circuit is implemented in the first semiconductor die, in step 402. Referring to step 403, a second portion of the second signal conditioning circuit is implemented in a second semiconductor die. Thereafter, in step 404, the first and second dies are bonded to a common substrate, and in step 405, wire bonding between the two dies is performed to complete the second signal conditioning circuit.

When the module design is performed, the signal conditioning circuit and ancillary circuits are integrated on the semiconductor dies in such a manner that the area of the die is minimized and other issues, such as noise and crosstalk, are also reduced. In the prior art, different signal conditioning and ancillary circuits are often disposed within the modules without foresight given to a reduction in module area and minimization of individual semiconductor die usage. Typically many different semiconductors dies are disposed within the module on the substrate, which unfortunately increases the manufacturing costs and does not result in a compact module size. Additionally, using some semiconductor manufacturing technologies is more costly for implementing of certain ancillary circuitry. For example, GaN and InP technologies have much larger costs associated with die usage than silicon-based technologies. As a result, implementing an ancillary circuit in InP or GaN becomes significantly more expensive than implementing the functionally similar ancillary circuit in a silicon based technology.

Though the embodiments of the invention refer to two or more signal conditioning circuits such as power amplifiers, it well understood and appreciated in the art that the efficient provision of ancillary circuits necessary or beneficial to the operation of other types of circuits is enabled using this invention. For example, other signal conditioning circuits, such as memory buffers are envisioned for use exclusively by a separate PLL-type circuit and die. In the context of a module, this invention is very useful because it obviates the placement of some additional dies within. It does, however, require that the IC designer and module designer work with an overall view of the module objectives and the requirements of the various functional circuits in the module. With this invention and the realization that some ancillary circuits will be integrated into the same semiconductor die area as the signal conditioning circuits unrelated to those ancillary circuits, the partitioning of signal conditioning circuits and the ancillary circuits becomes an optimization task.

Though the above embodiments refer to a SiGe BiCMOS manufacturing technology, other suitable manufacturing technologies for integration of the ancillary circuitry is also supported according to the invention.

The embodiments of the invention further advantageously allow for integration of silicon-based technologies with other technologies such as GaAs, InP, and GaN that do not support a similar level of component integration.

Numerous other embodiments may be envisaged without departing from the spirit or scope of the invention.

What is claimed is:

1. An electronic apparatus comprising:
   a first integrated circuit semiconductor die of a first semiconductor technology comprising:
      a first signal conditioning circuit integrated within the first integrated circuit semiconductor die for performing a first signal conditioning function on a signal propagating along a first signal path;
   a first ancillary circuit integrated within the first integrated circuit semiconductor die and electrically coupled to the first signal conditioning circuit for other than performing the first signal conditioning function and for use by the first signal conditioning circuit during operation thereof;
   a second integrated circuit semiconductor die of a second semiconductor technology physically different from the first semiconductor technology comprising a second signal conditioning circuit integrated within the second integrated circuit semiconductor die for performing a second signal conditioning function on a signal propagating along a second signal path that is different than the first signal path;
   a second ancillary circuit integrated within the first integrated circuit semiconductor die and electrically coupled to the second signal conditioning circuit for other than performing the second signal conditioning function and for use by the second signal conditioning circuit during operation thereof;
   a substrate for supporting the first and second integrated circuit semiconductor dies and for providing electrical connection to and from the first and second integrated circuit semiconductor dies.

2. An electronic apparatus according to claim 1, wherein the first signal conditioning function and the second signal conditioning function provide similar signal conditioning operations.

3. An electronic apparatus according to claim 1, wherein the first semiconductor technology is a silicon based technology.

4. An electronic apparatus according to claim 3, wherein the second semiconductor technology is an other than silicon based technology.

5. An electronic apparatus according to claim 1, wherein the first signal conditioning circuit comprises at least a power amplifier circuit and where the function of the first signal conditioning circuit is for amplifying of an input signal using the at least a power amplifier circuit.

6. An electronic apparatus according to claim 5, wherein the first ancillary circuit comprises at least one of voltage regulation circuitry and temperature control circuitry.

7. An electronic apparatus according to claim 1, wherein the second signal conditioning circuit comprises at least a power amplifier circuit and where the function of the second signal conditioning circuit is for amplifying of an input signal using the at least a power amplifier circuit.

8. An electronic apparatus according to claim 7, wherein the second ancillary circuit comprises at least one of voltage regulation circuitry and temperature control circuitry.

9. An electronic apparatus according to claim 1, wherein the second semiconductor technology is less suitable than the first semiconductor technology for the integration of an ancillary circuit therein for performing a functionality of the second ancillary circuit.

10. An electronic apparatus according to claim 9, wherein the second semiconductor technology is incompatible for the integration of an ancillary circuit therein for performing the functionality of the second ancillary circuit.

11. An electronic apparatus according to claim 9, wherein the second semiconductor technology is more costly than the first semiconductor technology for the integration of an ancillary circuit therein for performing the functionality of the second ancillary circuit.

12. An electronic apparatus according to claim 1, wherein the first semiconductor technology is a first one of Si, SiGe, GaAs, InP, and GaN.

13. An electronic apparatus according to claim 12, wherein the second semiconductor technology is a second one of Si, SiGe, GaAs, InP, and GaN, different from the first one of Si, SiGe, GaAs, InP, and GaN.

14. An electronic apparatus according to claim 1, wherein the first integrated circuit semiconductor die comprises BiCMOS based technology.

15. An electronic apparatus according to claim 14, wherein the first semiconductor technology comprises SiGe.

16. An electronic apparatus according to claim 1, wherein the first integrated circuit semiconductor die comprises a first interface port connected to the second ancillary circuit and wherein the second integrated circuit semiconductor die comprises a second interface port connected to the second signal conditioning circuit, the second signal conditioning circuit for being connected to the second ancillary circuit using the first and second interface ports.

17. An electronic apparatus according to claim 1, wherein the second signal conditioning circuit is for performing the second signal conditioning function in conjunction with operation of the second ancillary circuit.

18. An electronic apparatus comprising:
a first integrated circuit die of a first semiconductor technology formed using a first semiconductor process, the first integrated circuit die other than requiring additional circuitry for use in performing a first signal conditioning function comprising:
 a first signal conditioning circuit for performing the first signal conditioning function and having a first input port for receiving a first input signal for performing the first signal conditioning function thereon and having a first output port for providing a first output signal therefrom;
 a first ancillary circuit electrically coupled to the first signal conditioning circuit for use by the first signal conditioning circuit during operation thereof;
a second ancillary circuit having a first interface port; and,
a second integrated circuit die of a second semiconductor technology physically different from the first semiconductor technology formed using a second semiconductor process and having a second input port for receiving a second input signal, and a second output port for providing a second output signal therefrom, the second integrated circuit die having a second interface port for interfacing with the first interface port for performing a second signal conditioning function in conjunction with the second ancillary circuit disposed on the first integrated circuit die with no signal communication occurring between the first and second input ports and between the first and second output ports.

19. An electronic apparatus according to claim 18, wherein the second integrated circuit die cannot provide the second function without operation of the second ancillary circuit.

20. An electronic apparatus according to claim 18, wherein the first signal conditioning function and the second signal conditioning function provide similar signal conditioning operations.

21. An electronic apparatus according to claim 18, wherein the first semiconductor technology is a silicon based technology.

22. An electronic apparatus according to claim 21, wherein the second semiconductor technology is an other than silicon based technology.

23. An electronic apparatus according to claim 18, wherein at least one of the first signal conditioning circuit and the second signal conditioning circuit comprises at least a power amplifier circuit.

24. An electronic apparatus according to claim 18, wherein the first ancillary circuit and the second ancillary circuit each comprises at least one of voltage regulation circuitry and temperature control circuitry.

25. An electronic apparatus according to claim 24, wherein the first semiconductor technology is one of Si, SiGe, GaAs, InP, and GaN.

26. An electronic apparatus according to claim 18, wherein the first integrated circuit die comprises BiCMOS based technology.

27. An electronic apparatus according to claim 18, comprising a module substrate for supporting the first and second integrated circuit dies and for providing electrical connection to and from the first and second integrated circuit dies.

28. An electronic apparatus according to claim 18, wherein the second semiconductor technology is less suitable than the first semiconductor technology for the integration of an ancillary circuit therein for performing a functionality of the second ancillary circuit.

29. An electronic apparatus according to claim 28, wherein the second semiconductor technology is incompatible for the integration of an ancillary circuit therein for performing the functionality of the second ancillary circuit.

30. An electronic apparatus according to claim 28, wherein the second semiconductor technology is more costly than the first semiconductor technology for the integration of an ancillary circuit therein for performing the functionality of the second ancillary circuit.

* * * * *